(12) United States Patent
Uehira

(10) Patent No.: US 6,772,078 B2
(45) Date of Patent: Aug. 3, 2004

(54) LINEAR SCALE READER

(75) Inventor: Takahisa Uehira, Mobara (JP)

(73) Assignee: Futaba Corporation, Mobara (JP)

(*) Notice: Subject to any disclaimer, the term of this patent is extended or adjusted under 35 U.S.C. 154(b) by 40 days.

(21) Appl. No.: 10/266,598

(22) Filed: Oct. 9, 2002

(65) Prior Publication Data

US 2003/0069707 A1 Apr. 10, 2003

(51) Int. Cl.[7] .............................................. G01D 18/00
(52) U.S. Cl. ........................ 702/85; 702/97; 702/158; 702/106; 702/159; 702/161; 73/1.79; 73/1.81; 356/498; 356/496; 356/3; 33/706; 33/707; 33/700
(58) Field of Search .......................... 702/85, 97, 158, 702/159, 106, 161; 73/1.79, 1.81; 356/498, 496, 3; 33/706, 707, 7

(56) References Cited

U.S. PATENT DOCUMENTS

| 4,231,662 | A | * | 11/1980 | Feinland et al. ............ 356/619 |
| 4,631,520 | A | * | 12/1986 | Wingate ...................... 341/13 |
| 4,912,322 | A | * | 3/1990 | Ichikawa ................. 250/237 G |
| 5,202,842 | A | * | 4/1993 | Suzuki ....................... 702/151 |
| 5,241,173 | A | * | 8/1993 | Howley et al. ......... 250/231.16 |
| 6,492,637 | B1 | * | 12/2002 | Fujita .................... 250/231.13 |
| 6,552,810 | B1 | * | 4/2003 | Hermann et al. ........... 356/614 |

* cited by examiner

*Primary Examiner*—John Barlow
*Assistant Examiner*—Anthony Dougherty
(74) *Attorney, Agent, or Firm*—Oblon, Spivak, McClelland, Maier & Neustadt, P.C.

(57) ABSTRACT

A length measuring apparatus is provided that combines upper data with lower data and then outputs the composite data. The apparatus monitors taking down or up a digit of upper data or lower data and synchronization of lower data, thus preventing an occurrence of reading error. When an A/D area showing an area of lower data matches with an upper area quadrant showing an area of upper data (R2, R3), the upper count value outputting the upper data is output without any change. When the quadrant (0, 1, 2, 3) of the A/D area does not match with the quadrant (0, 1, 2, 3) of upper area because of an erroneous timing of a digit-taking-up of upper data (R1, R4), +1 or −1 is added to the upper count value. Thus, the continuity of a measured value can be obtained when the scale is being moved.

3 Claims, 6 Drawing Sheets

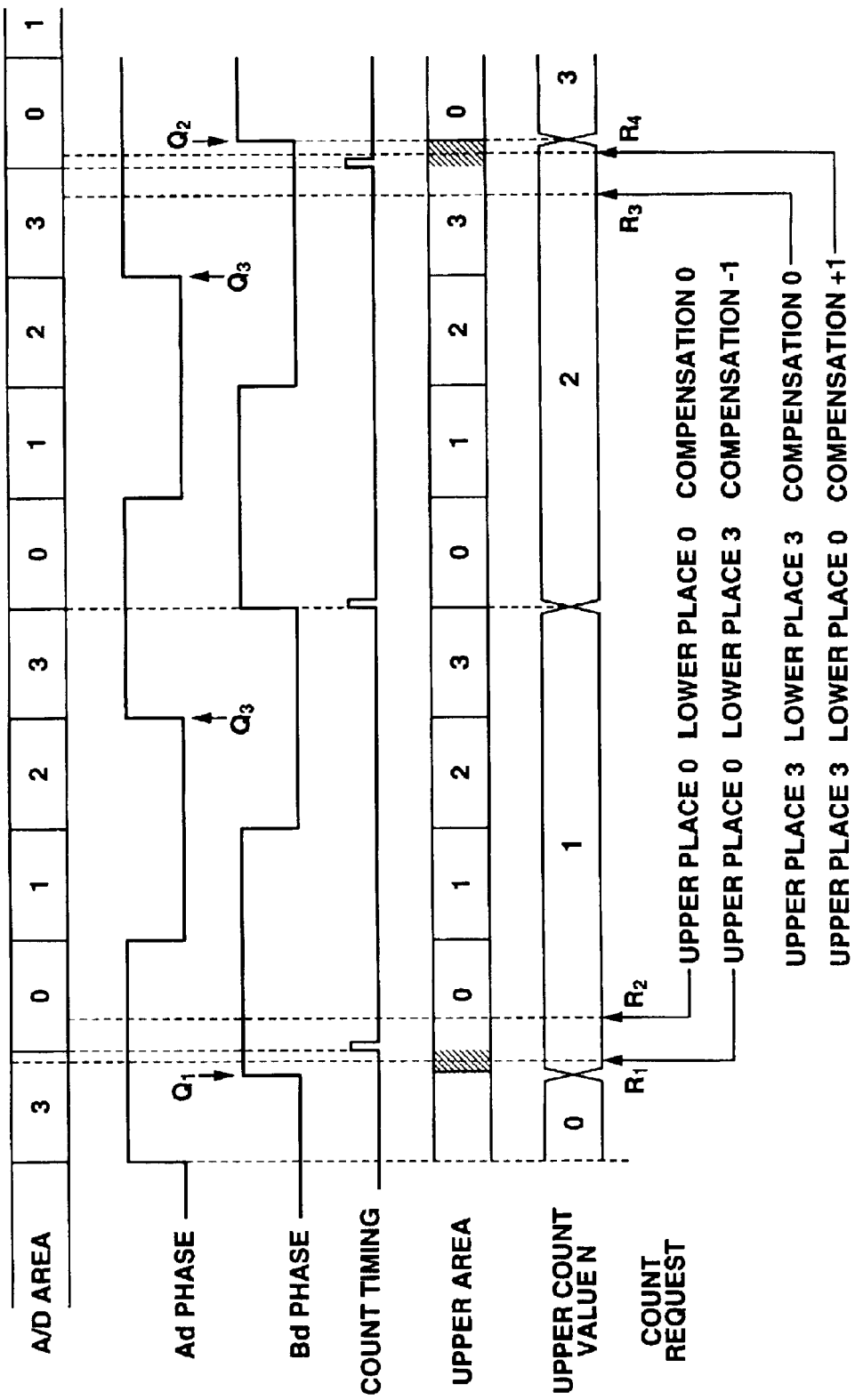

FIG.5
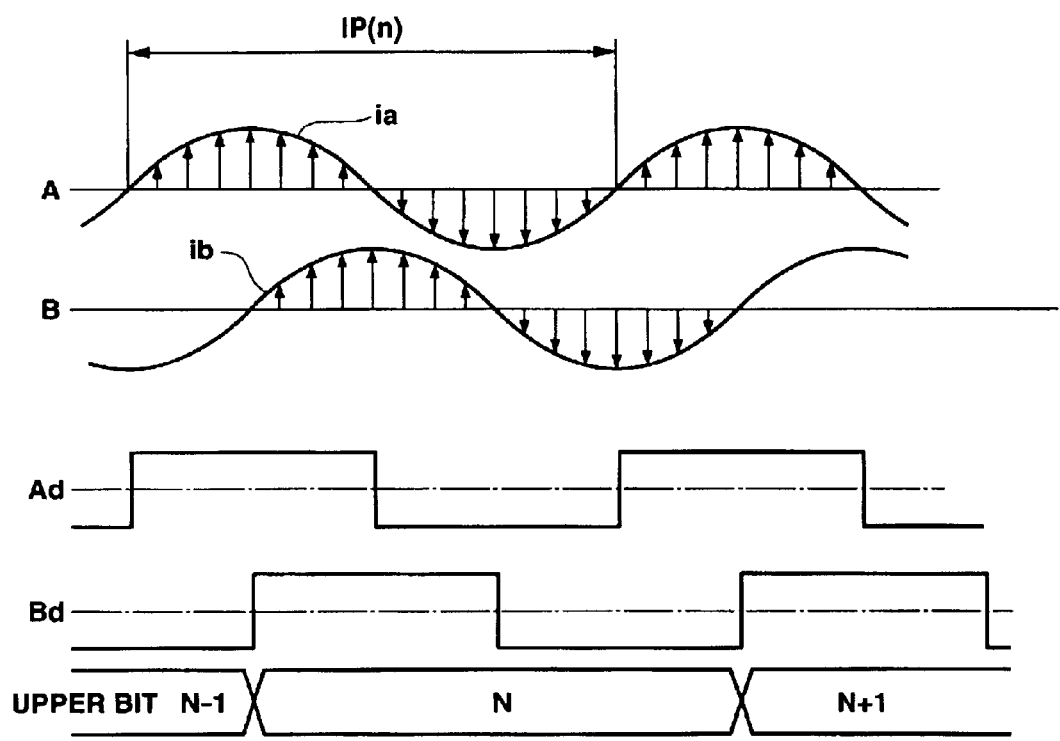
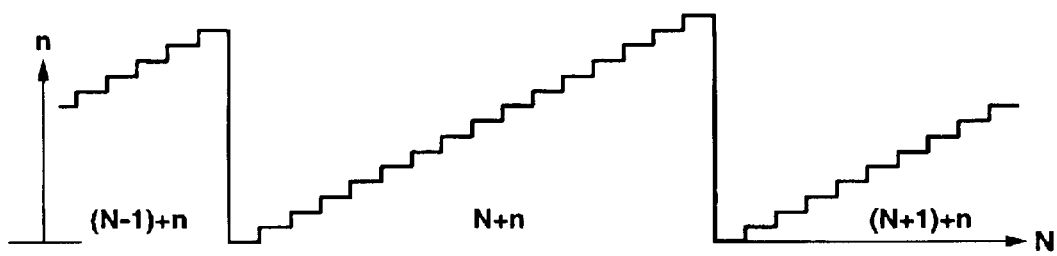

LINEAR SCALE READER

BACKGROUND OF THE INVENTION

1. Field of the Invention

The present invention relates to a linear scale reader.

2. Description of the Prior Art

Conventionally, some of machine tools are provided with, for example, glass linear scales for reading the position of a workpiece. In the linear scale, light is illuminated onto the linear scale and a relative travel distance of a workpiece can be measured using the reflected light.

In some known linear scales, magnetic score marks are inscribed in a metal scale and movement of the scale can be read by means of variations in magnetic field.

Such a linear scale generally is provided with an operation circuit which computes lower measured values obtained by sub-dividing one pitch of the scale, in order to obtain higher precision than a pitch between score marks.

FIG. 4 shows schematically a method of reading the above-mentioned linear scale. Referring to FIG. 4, a glass linear scale 10, which forms a length measuring apparatus, is provided a main scale 10a and a sub-scale 10b.

Each of the scales 10a and 10b includes a grid having score mark formed at predetermined intervals. A relative movement between the main scale 1a and the sub-scale 1b is detected by detecting Moire fringes of light passing through the score marks of the two scales.

An optical system 20 illuminates light onto the linear scale 10. The optical system 20 generally includes a light emitting element 21 and light receiving elements 22(a) and 22(b). The light emitting element 21 illuminates light onto the linear scale 10. Each of the two light receiving element 22(a) and 22(b) detects a Moire fringes based on translucent light or reflected light of the illuminated light and then converts them into an electrical signal. When the scale travels at a constant rate, a relative movement thereof is output as a sine-wave-like Lissajous' figure.

In this case, by shifting the position of a received light spot, the light receiving element 22a produces an A-phase signal while the light receiving element 22b produces a B-phase signal, the A-phase signal and the B-phase signal being shifted 90° from each other. Thus, the travel direction of the scale can be detected.

The A-phase signal is supplied to the amplifier 23a and the B-phase signal is supplied to the amplifier 23b. The amplifier 23a, 23b is formed of, for example, a high-gain differential amplifier. The amplifier 23a converts the A-phase signal into a voltage signal level of about 2 Vp-p and the amplifier 23b converts the B-phase signal into a voltage signal level of about 2 Vp-p. The amplifier 23a supplies the converted signal to the A/D converter 24(a), which converts an analog signal into a digital signal. The amplifier 23b supplies the converted signal to the A/D converter 24(b).

The comparator 25 receives the outputs of the amplifiers 23a and 23b and then converts them into rectangular waveforms inverted to zero levels. For example, the upper counter 26 receives the B-phase signal, of which the phase is shifted 90°, and then counts, for example, the rising edges of rectangular waves.

When the main scale 10a shits from the sub-scale 10b by one pitch, the upper counter 26 outputs the measured length data N of upper bits, in which the count value is incremented by 1.

The A/D converter 24a, 24b samples sine wave detection signals, each representing a relative value of an input sine wave scale, every predetermined phase intervals, and then outputs them as digital values.

In this case, the A/D converter 24(a) samples an A-phase detection signal and then outputs the sampled signal as a digital signal. The A/D converter 24(b) samples a B-phase detection signal and then outputs the sampled signal as a digital signal. As described later, the phase division data of a sine wave signal is computed based on both the sampling values. The phase division data with high precision, obtained by further dividing the upper data, is output. That is, a ROM table 27 which previously stores lower data is read out, with the outputs of the A/D converters 24a and 24b acting as address signals. Thus, the lower data n, obtained by multiplying one pitch of the scale by a phase division number, is output.

An adder 28 adds the lower measured length data n read out from the ROM table and the upper data N in which one pitch unit of the scale is a measured length value and then supplies its output to a measured length display (not shown).

The measured length display latches and manifests the value of a request signal.

FIG. 5 shows a sine-wave-like A-phase signal iA and a sine-wave-like B-phase signal iB, created from Moire fringes generated when a linear scale is relatively moving at a fixed rate.

Ad represents an upper signal waveform output from the comparator 25, inverted at the zero level of an A-phase signal iA. Bd represents an upper signal waveform output from the comparator 25, inverted at the zero level of an B-phase signal iB. In this example, when the scale is moving in one direction, the upper counter 26 produces an addition output of upper bits N at the time the B-phase signal from the comparator 25 rises. When the scale is moving in the opposite direction, a subtraction output from the upper counter is output at the time the B-phase signal falls.

Both the sine-wave Lissajous' figure A supplied from the A/D converter 23a and the sine-wave Lissajous' figure B supplied from the A/D converter 23b are sampled every predetermined phases, as shown in FIG. 5. Thus, the lower bit data (n) can be read out from the ROM table, with the sampling data acting as an address signal. As shown in FIG. 5, the lower data n takes a value increasing stepwise and linearly every pitch. By adding upper data N, the resolution of the scale to a relative moving distance is improved.

In the above-mentioned linear scale reading method, because upper data N and lower data n are not output in a synchronous mode, an error may occur in the vicinity of a digit-taking-up of upper data (or a digit-taking-down of upper data).

This process will be explained with reference to FIG. 6.

Referring to FIG. 6, n represents lower position data output when a linear scale is relatively moving at a constant rate. N represents upper count data. The measured length display manifests a value (N+n).

When the lower data becomes 99 normally with the sampling timing Sy, Sx, it is read out with the timing at which the upper data is incremented.

The point where the digit of upper data takes up corresponds to the timing where inversion occurs at the zero level of the B-phase signal. However, the point where the A-phase signal or B-phase signal and the zero level cross changes, for example, due to noises induced slightly. Moreover, the cross point may change due to dust adhered to during movement of the scale.

A change of the cross point makes unstable the timing with which the upper count value N increments, as shown in FIG. 6.

It is now assumed that the lower measured length data is n and that the resolution is 1/100. In the case of n=100, one pitch (0.1 mm) is obtained. In such a case, with the sampling timing S1, because the upper data N is 0 and the lower data n is 90 μm, the relative moving distance is 90 μm.

However, because taking up, or carry, of the digit of the upper data erroneously speeds up with the sampling timing S2, the moving distance to be displayed jumps to 290 μm when the lower data n is 90. Because the moving distance is actually 190 μm, the error is very large.

With the sampling timing S3, the upper count data N is 2 and the lower data n is 10.

Therefore, the relative moving distance of the scale is 210 μm. However, the accurate measured length value is 310 μm with the sampling timing S3.

As described above, the conventional linear scale measured length reading method has such a disadvantage. That is, because different circuits create lower data n and upper data N, respectively, the measured value jumps by +1 or −1 when noises are induced into, particularly, the upper data creation circuit. When that linear scale is used as feedback information for a machine tool, the machine tool cannot be smoothly driven.

SUMMARY OF THE INVENTION

The present invention is made to solve the above-mentioned problems.

An object of the invention is to provide a linear scale reader capable of eliminating scale-reading errors.

Another object of the present invention is to provide a linear scale reader that reads intervals between score marks based on upper data and lower data obtained by further sub-dividing the upper data to improve the length measurement precision of the scale.

According to the present invention, a linear scale reader comprises a first length-measuring unit for detecting a measured length value corresponding to a score mark of a linear scale as two-phase signals shifted 90° from each other and thus reading as upper data the pitch period of the score mark; a second length-measuring unit for phase dividing two two-phase signals by means of an A/D converter and reading lower data, which is obtained by dividing the period by a predetermined number; a device for outputting a composite value as a linear scale reading value, the composite value obtained by adding the upper data to the lower data; a latch circuit for latching polarities of two-phase signals output from the first length-measuring unit; a quadrant determination circuit for identifying lower data output from the second length-measuring unit, based on a 90-degree phase quadrant of the two-phase signals, and issuing the lower data into four phase areas; and a comparator for comparing a quadrant signal output from the latch circuit with a quadrant signal output from the quadrant determination circuit; whereby a counter output of upper data is corrected within a range of +1 to −1, in the vicinity of a digit taking-up of at least upper data and in response to a comparison result from the comparator.

BRIEF DESCRIPTION OF THE INVENTION

This and other objects, features, and advantages of the present invention will become more apparent upon a reading of the following detailed description and drawings, in which:

FIG. 2 is a timing waveform diagram illustrating relationships between an A/D area forming lower data, an upper area forming upper data, and an upper count value;

FIG. 5 is a waveform diagram explaining upper bit data and lower bit data created by a linear scale.

DETAILED DESCRIPTION OF THE PREFERRED EMBODIMENT

Figure 1:
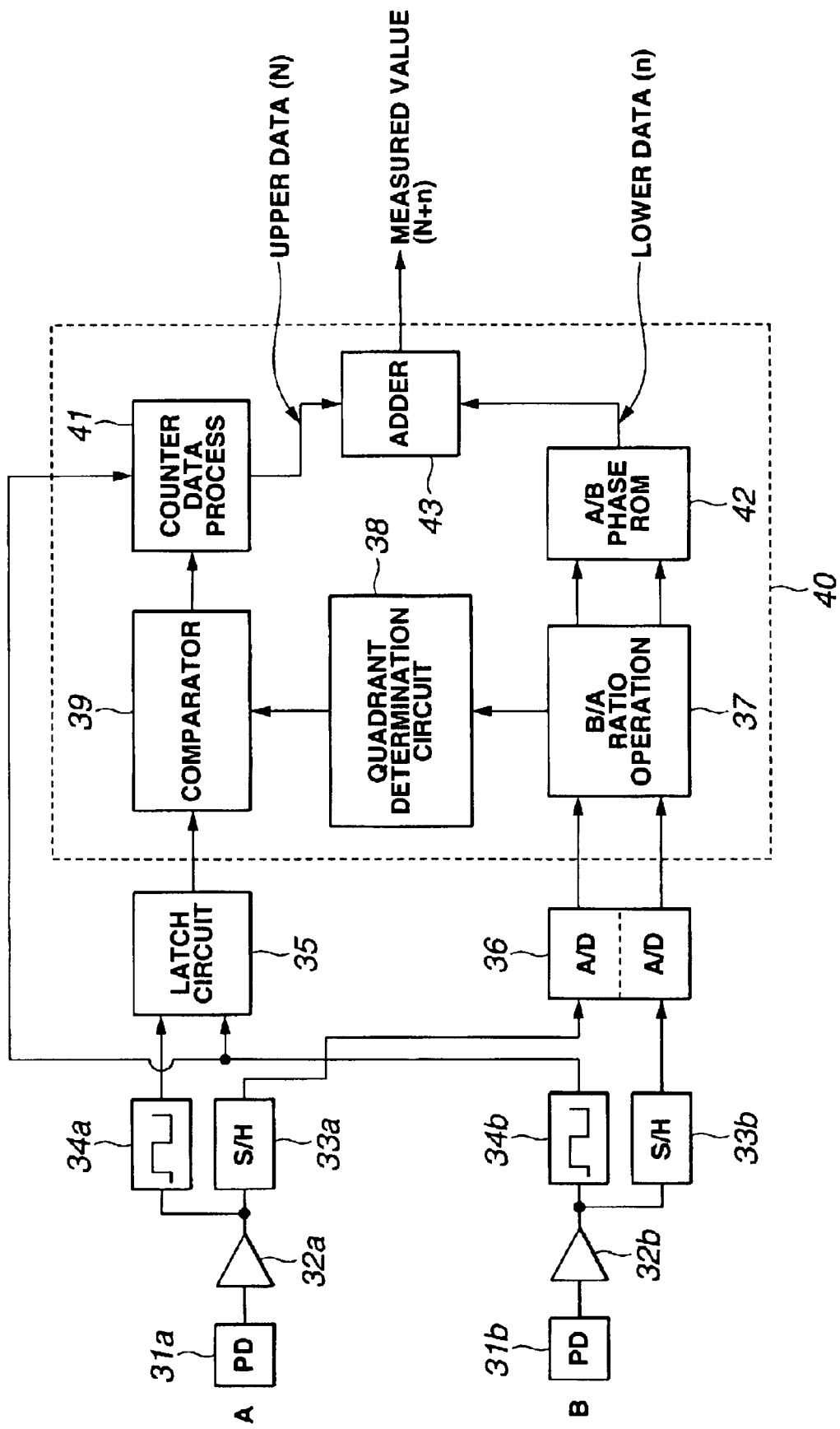
FIG. 1 is a block diagram illustrating an outline of a linear scale reader according to an embodiment of the present invention.

FIG. 1 is a block diagram explaining a linear scale reader.

Figure 4:
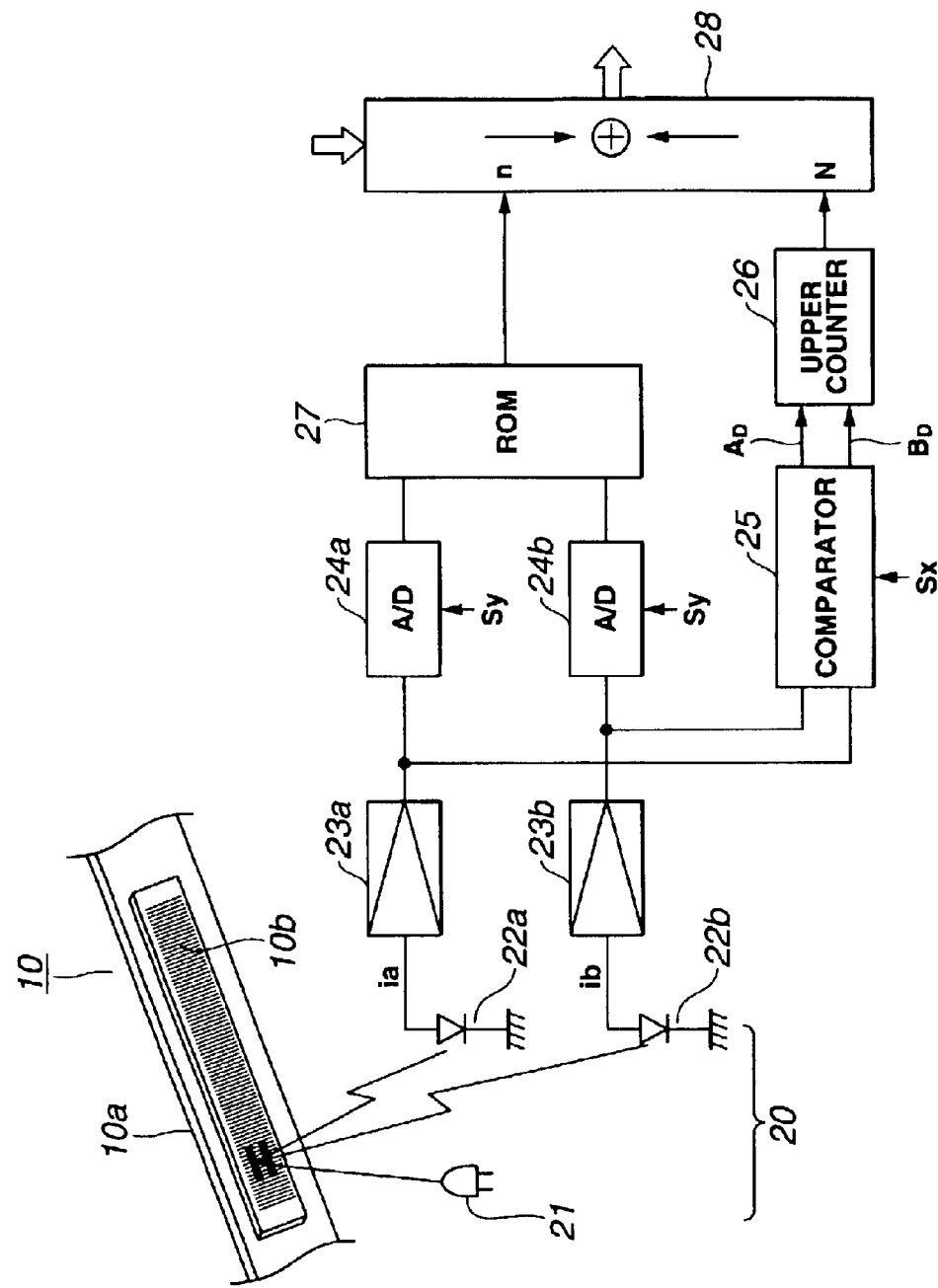
FIG. 4 is a block diagram illustrating an outline of a length measuring apparatus with a liner scale.
Figure 6:
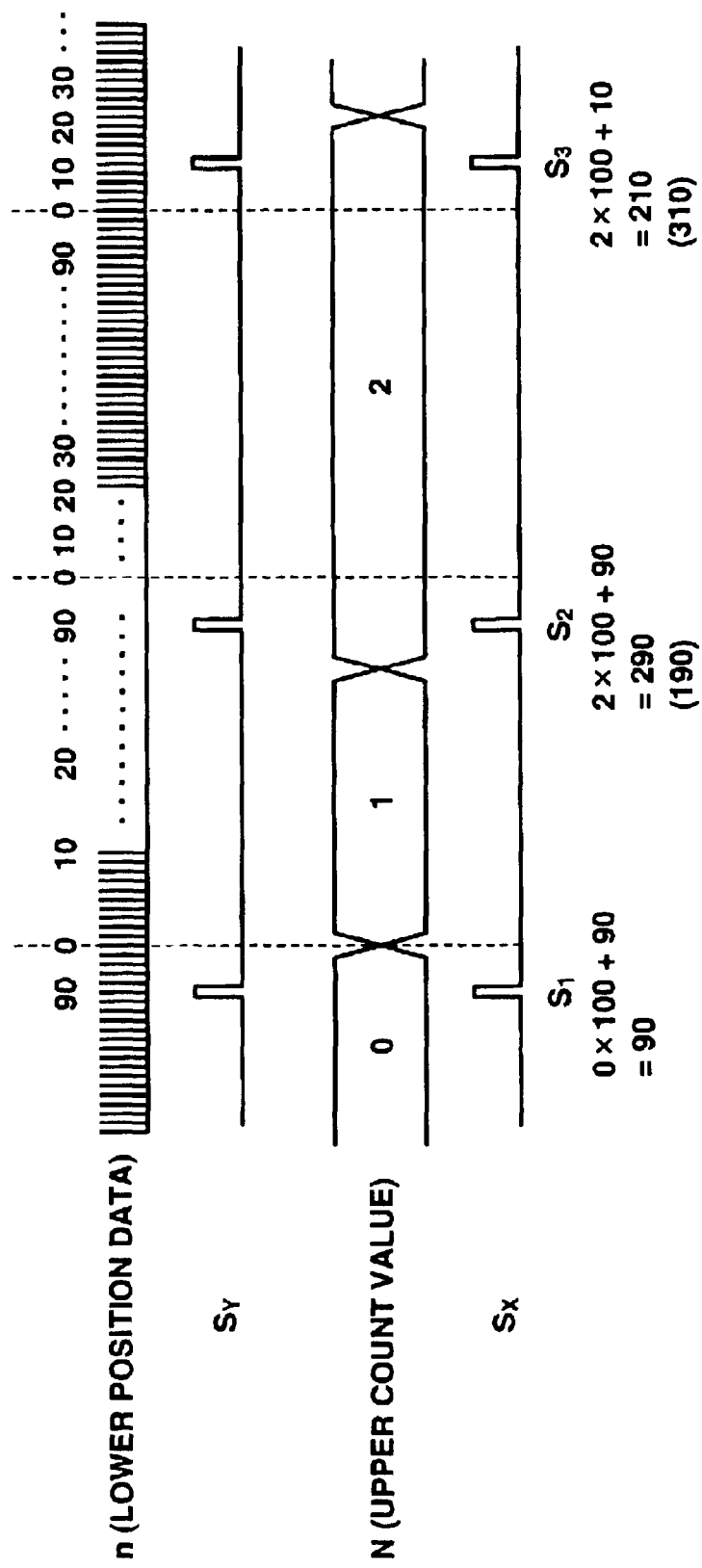
FIG. 6 is a waveform diagram explaining a length measurement error in combination of upper data and lower data.

Referring to FIG. 1, each of light receiving elements 31a and 31b corresponds to the light receiving element that receives a measured length signal shown in FIG. 4. The light receiving element 31a generates an A-phase signal form Moire fringes. The light receiving element 31b generates a B-phase signal form Moire fringes. Each of numerals 32a and 32b represents an amplifier that amplifies a detected measured length signal.

A sampling circuit 33a samples the level of an A-phase signal and a sampling circuit 33b samples the level of a B-phase signal. As the sampling period becomes higher, the lower data, which increases the resolution of a measured length memory, can be obtained.

A comparator 34a outputs a rectangular wave signal inverted at the zero level of an A-phase signal. A comparator 34b outputs a rectangular wave signal inverted at the zero level of a B-phase signal. A latch circuit 35 holds the A-phase signal (a rectangular wave signal) and the B-phase signal (a rectangular wave signal) until each of the level values changes. The count data processor 41 (to be described later) receives one output (the B-phase signal) and then creates upper data N of the scale.

The A/D converter 36 converts data sampled by the sampling circuit 33a and data sampled by the sampling circuit 33b into two-valued signals and then supplies them to the B/A ratio operation circuit 37. The two-valued signals correspond to the phase-sampled signal of the A-phase signal and to the phase-sampled signal of the B-phase signal, respectively.

That is, the B/A ratio operation circuit 37 converts the relative moving distance of the scale varying in a sine wave form into level signals having a phase difference of 90° and computes the level ratio thereof.

For example, when the level of the B-phase signal rises gradually from sin θ, the level of the A-phase signal varies in the direction decreasing from sin(π/2)+θ. Thus, the level difference ratio A/B is computed. The level values (relative distances) when a sine wave period is computed at arbitrary sampling points are computed.

Figure 3B:
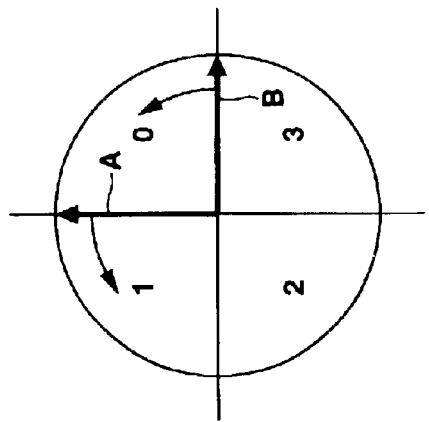
FIG. 3 is a flowchart illustrating for compensating an upper count value.

Numeral 38 represents a quadrant determination circuit in an A/D sampling area (hereinafter merely referred to as an A/D area). As shown in FIG. 3(b), the area 0 represents the quadrant range where the A-phase signal has a positive value and the B-phase signal has a positive value. The area 1 represents the quadrant range where the A-phase signal has a negative value and the B-phase signal has a positive value. The area 2 represents the quadrant range where the A-phase signal has a negative value and the B-phase signal has a negative value. The area 3 represents the quadrant range where the A-phase signal has a positive value and the B-phase signal has a negative value.

The comparator 39 decides whether or not the output of the quadrant determination circuit 38, which determines the lower data quadrant, matches with the output of the latch circuit 35. Thus, the correction (compensation) output for eliminating the previously described problems is obtained from the comparator 39.

A count data processor 41 includes a count processor that counts upper data N and that adds +1 or −1 to the count value by means of decision of the output of the comparator. A ROM table 42 reads lower bit data obtained by sub-dividing one pitch of the scale by the numeral value of the B/A ratio operation circuit acting as an address signal.

The comparator 43 adds lower bit data n to upper data N corrected by the count data processor 41. Thus, adding the lower data allows a relative moving distance of the linear scale to be output with high resolution.

FIG. 2 is a waveform diagram explaining a reading method according to the present invention.

Referring to FIG. 2, the A/D area is numeral data representing the quadrant of the A-phase signal and the quadrant of the B-phase signal, as previously described. The area 0 represents the period of the quadrant where the A-phase signal has a positive value and the B-phase signal has a positive value. The area 1 represents the range of the quadrant where the A-phase signal has a negative value and the B-phase signal has a positive value. The area 2 represents the period of the quadrant where the A-phase signal has a negative value and the B-phase signal has a negative value. The area 3 represents the period of the quadrant where the A-phase signal has a positive value and the B-phase signal has a negative value.

Referring to FIG. 2, when the scale is sent at a nearly constant rate, the quadrant determination circuit 38 outputs as an A/D area signal the A-phase signal and the B-phase signal, each in a nearly sine-wave form, as previously described. The comparator 34a issues an output signal Ad and the comparator 34b issues an output signal Bd. At the rising point of the output signal Bd, when the upper counter 41 is incremented so that the count value N of the upper area changes.

When the comparator 34 creates a carry signal (or a digit taking-up signal), noises or impulses may occur near to the zero level. In such a case, the upper area (0, 1, 2, 3) is created with the timing different from that in the quadrant inverted in the A/D area at the point Q1 or Q2.

Thereafter, when a counter request comes, for example, at the point R1, the quadrant of the A/D area is detected erroneously as 3 while the quadrant of the upper area is 0. In other words, with the timing immediately before the lower data produces a carry, the upper count value N is set to 1 although it must be set to zero. Hence, when the value measured in the A/D area is 0.90, 1.90 is erroneously issued.

According to the present invention, when the upper area does not match with a quadrant in the A/D area, the count data processor 41 (in FIG. 1) compensates the value or adds −1 to the upper data.

With the count request of R2, both the upper area and the A/D area match 0 with each other. The measured length data (M+n) output from the adder 43 (FIG. 1) is not normally output.

However, with the timing R4 where inversion of the Bd signal is delayed and the output of upper data is delayed, as shown at the point Q2 in FIG. 2, when a count request comes, the upper area is 3 while the A/D area is 0. Hence, the upper count value becomes 2. This means that the measured length data is not in a match state. In such a case, +1 is added to the upper count value so that the count data at a request time is corrected to, for example, 3.10.

Because both the upper area and the A/D area are 3 at the request timing R3, the measured length data (N+n) output from the adder 43 (FIG. 1) is normally issued.

The case where the upper data produces a carry (a digit taking-up) at the time when the B-phase signal rises has been explained above. However, even when the A-phase signal produces a carry, a modified circuit can match the quadrant of the lower bit data n with the quadrant of the upper data.

Figure 3A:
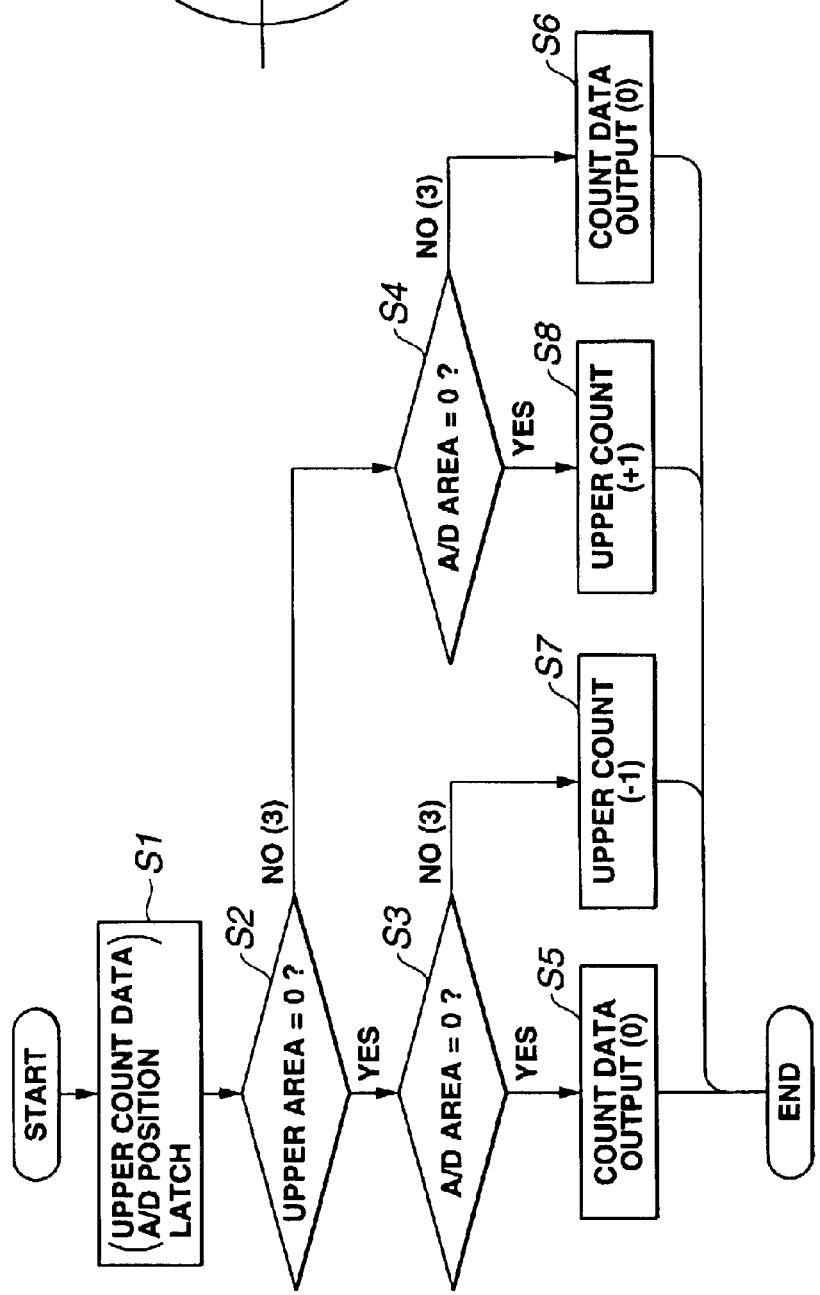

FIGS. 3(a) and 3(b) are diagrams each for explaining a correction flow of the count processor. These show that how the count processor performs correction to a match or mismatch of a quadrant when the A/d area and the upper area are determined as shown in FIGS. 2 and 3(b), with the B-phase signal delayed 90° to the A-phase signal. That flow acts as a sequence program when the circuit of FIG. 1 is digitally configured using a microprocessor.

In the step S1, measured length values of the scale are sampled every constant time or every request time. When the counter is set up or down at the rising edges of the B-phase signal, respective quadrants can be set, for example, as shown in FIG. 3(b).

In the step S2, the upper quadrant area is first decided. When the upper quadrant area is 0, lower bit data is next decided in the step S3. When both the upper quadrant area and the lower quadrant area match with each other, the upper counter outputs a correction value of zero (R2 in FIG. 2).

When the upper quadrant area is not zero (is, for example, 3) in the step S1, the lower A/D quadrant area is decided in the step S4. When the upper quadrant area is zero (is, for example, 3) in the step S1, the upper counter outputs a correction value of zero (R3 in FIG. 2).

As described above, when the upper data quadrant and the lower data quadrant match with each other, the output correction value of the upper counter becomes zero. However, in the steps S3 and S4, when the quadrant for the upper data does not match with the quadrant for the lower data, +1 or −1 is added to the output of the upper counter. Thus, the scale reading error, to be solved by the present invention, is eliminated.

For example, with the quadrant area for the upper data being zero in the step S2 and the quadrant area for the lower data being 3 in the step S3, an accurate composite value is created (R1 in FIG. 2) by adding −1 to the upper counter.

With the upper data area being 3 in the step S2 and the quadrant for the lower data area being zero in the step S4, +1 is added to the upper counter (R4 in FIG. 2).

In this embodiment, the case where the count increments at the point when the B-phase signal rises has been explained above. However, when the count increments at the point when the A-phase signal rises, the output of the upper counter is corrected near to the quadrant signals 2 and 3, as understood from the quadrant in FIG. 3(b).

It is desirable that the output of upper counter is corrected adjacent to the quadrant where the count value is incremented. Even when the scale is reversely traveled, the output of the upper counter is corrected near to the quadrant where a digit is taken down.

As described above, the present invention relates to an apparatus that outputs as a linear scale reading value a composite value being an addition of upper data and lower data. This apparatus includes a latch circuit for latching the polarities of two-phase signals output from the first length-measuring unit, a quadrant determination circuit for identifying lower data output from the second length-measuring unit, based on a 90° phase quadrant of the two-phase signals, and issuing the lower data into four phase areas, and a comparator for comparing a quadrant signal output from the latch circuit with a quadrant signal output from the quadrant determination circuit. Because the counter output of the upper data is corrected in a range of +1 to −1, the continuity of measured-length values read out from the linear scale can be held. This feature can provide the advantage in that the machine tool can perform an accurate feedback control.

What is claimed is:

1. A linear scale reader comprising:
   a first length-measuring unit for detecting a measured length value corresponding to a score mark of a linear scale as two-phase signals shifted 90° from each other and thus reading as upper data the pitch period of said score mark;
   a second length-measuring unit for sampling two two-phase signals by means of an A/D converter and reading lower data, which is obtained by dividing said period by a predetermined number;
   a device for outputting a composite value as a linear scale reading value, said composite value obtained by adding said upper data to said lower data;
   a latch circuit for latching polarities of two-phase signals output from said first length-measuring unit;
   a quadrant determination circuit for identifying lower data output from said second length-measuring unit, based on a 90-degree phase quadrant of said two-phase signals, and issuing said lower data into four phase areas; and
   a comparator for comparing a quadrant signal output from said latch circuit with a quadrant signal output from said quadrant determination circuit;
   whereby a counter output of upper data is corrected within a range of +1 to −1, in the vicinity of a digit taking-up of at least upper data and in response to a comparison result from said comparator.

2. The linear scale reader as defined in claim 1, wherein said two-phase signal comprises a signal obtained by converting Moire fringes of said linear scale into an electrical signal.

3. The linear scale reader as defined in claim 1 or 2, wherein said linear scale comprises a main scale and a sub-scale.

* * * * *

UNITED STATES PATENT AND TRADEMARK OFFICE
CERTIFICATE OF CORRECTION

PATENT NO.   : 6,772,078 B2
DATED        : August 3, 2004
INVENTOR(S)  : Uehira

It is certified that error appears in the above-identified patent and that said Letters Patent is hereby corrected as shown below:

<u>Title page,</u>
Item [30], should read
-- [30]   Foreign Application Priority Data
Oct. 10, 2001   (JP) ........................... 2001-312558 --

Signed and Sealed this

Eighth Day of February, 2005

JON W. DUDAS
*Director of the United States Patent and Trademark Office*